United States Patent [19]

Kostic

[11] 4,240,939

[45] Dec. 23, 1980

[54] WOOD FINISHING COMPOSITION

[76] Inventor: Sam Kostic, 744 Kilkeel Pl., North Vancouver, British Columbia, Canada, V7N 2X1

[21] Appl. No.: 13,017

[22] Filed: Feb. 21, 1979

[51] Int. Cl.³ .......................... C08L 93/02; C09G 1/10
[52] U.S. Cl. ................................ 260/22 TN; 106/3; 106/6; 106/7; 260/26
[58] Field of Search .............. 106/3, 6, 7; 260/22 TN, 260/26

[56] References Cited

U.S. PATENT DOCUMENTS

| | | | |
|---|---|---|---|
| 1,413,145 | 4/1922 | Weisberg | 260/26 |
| 1,999,096 | 4/1935 | Haroldson | 260/26 |
| 2,070,553 | 2/1937 | Pullman | 260/26 |
| 2,844,554 | 7/1958 | Nichols et al. | 260/22 TN |
| 3,219,635 | 11/1965 | Emrick | 106/3 |
| 3,931,077 | 1/1976 | Uchigaki et al. | 260/26 |
| 4,070,510 | 1/1978 | Kahn | 106/6 |

FOREIGN PATENT DOCUMENTS

| | | | |
|---|---|---|---|
| 2259265 | 6/1973 | Fed. Rep. of Germany | 106/6 |
| 206004 | 11/1923 | United Kingdom | 106/6 |
| 363036 | 12/1931 | United Kingdom | 106/6 |

*Primary Examiner*—Ronald W. Griffin
*Attorney, Agent, or Firm*—Christie, Parker & Hale

[57] ABSTRACT

A wood finishing composition comprising about three parts by volume of an alcoholic solution of white shellac, about two parts by volume of a solution of an oil modified polyurethane resin and about one part by volume of a drying oil. The wood finishing composition produces finishes on wood comparable to prior art compositions, for example french polish, that require considerable skill and time in application.

8 Claims, No Drawings

WOOD FINISHING COMPOSITION

FIELD OF THE INVENTION

This invention relates to a composition useful in the finishing of wood.

DESCRIPTION OF THE PRIOR ART

Traditional methods of the finishing wood, for example, french polishing, have required considerable skill on the part of the person applying the finish and considerable time. Furthermore the finished surface can be damaged fairly easily by knocks or by liquids, and refinishing of the article generally requires the complete removal of all the old polish followed by repolishing of the surface.

SUMMARY OF THE INVENTION

The present invention seeks to provide a wood finishing composition that is extremely easy to apply, that produces an excellent finish, comparable to the best polished finishes, and yet has excellent durability and wear resistance and is resistant to liquids even alcoholic liquids.

Thus, the present invention is a wood finishing composition comprising about three parts by volume of an alcoholic solution of white shellac; about two parts by volume of a solution of an oil-modified polyurethane resin; and about one part by volume of a drying oil.

The oil modified polyurethane resin is a poly (ester-urethane) oil containing an excess of the oil. A typical formulation is made in conventional fashion from:

Soya bean oil: 60%
phthalic anhydride: 10%
pentaerythritol: 10%
toluene diisocyanate: 10%

There is no free diisocyanate.

It will be appreciated that polyurethane of similar properties can be produced based on different oils, on carboxylic acid different from phthalic anhydride and on different polyhdroxy compounds from pentaeythritol. Different isocyanates can also be used. The various equivalents of the above materials are well known in the polyurethane art.

A natural drying oil may be used, for example, linseed oil, but urethane oils have also proved useful. Such oils are prepared by alcoholysis of an unsaturated glyceride with a polyol, such as trimethylol propane, followed by reaction of the product with a diisocyanate, usually toluene diisocyanate.

Examples of compositions according to the invention are as follows:

COMPOSITION 1

(a) Three parts by volume of an alcoholic solution of white shellac.

(b) Two parts by volume of the substance available under the trade mark Flecto Varathane Plastic No. 90 Clear Gloss, an oil-modified polyurethane resin in mineral spirits solvent.

(c) One part by volume of a urethane oil available under the trade mark Flecto Varathane Plastic Oil Finish No. 66.

COMPOSITION 2

Three parts by volume of an alcoholic solution of white shellac. Two parts by volume of an oil-modified polyurethane resin available under the trade reference Polyurethane Plastic Finish and one part by volume of boiled linseed oil.

COMPOSITION 3

Three parts by volume of an alcoholic solution of white shellac. One part by volume of an oil-modified polyurethane resin available under the trade mark Clear Gloss Poly Glo. One part of boiled linseed oil.

All the above compositions were simply prepared by mixing together the three components. Once mixed in this manner the composition according to the present invention has a considerable shelf life and experiments indicate that a shelf life of six months can easily be obtained.

The composition according to the present invention can be used on either new wood or on surfaces previously varnished.

On previously varnished furniture it is necessary to sand the surface well then apply one coat of the composition. It is desirable to apply the coating evenly, preferably by the use of an electric buffing machine with the composition impregnated into the buffing pad. Such a machine desirably reciprocates rapidly with about a quarter inch stroke. Buffing for fifteen minutes provides an excellent, permanent and highly polished coating.

On new wood the procedure to follow is precisely the same as the procedure that one would use in applying any other high quality finish, for example french polish. The wood to be finished is sanded well and then an oil stain is applied. The excess oil stain is wiped off which also ensures that the stain is evenly distributed on the surface. A composition according to the invention is then applied as a coat, again, preferably by absorbing the composition into the pad of an electric, reciprocating buffer machine. For ideal results the buffing is stopped about 15 minutes and a further coat is applied after about 2 weeks, again with buffing.

An ideal buffing pad for the application of the composition is as in french polishing, that is an absorbent material that can be rolled into a ball and wrapped in a material that does not shed fibres. Flannelette has been found to be ideal as the outer material.

I claim:

1. A wood finishing composition comprising
   about three parts of volume of an alcoholic solution of white shellac;
   from about one part of about two parts by volume of a solution of an oil modified polyurethane resin; and
   about one part by volume of a drying oil.

2. A composition as claimed in claim 1 in which the oil modified polyurethane resin is a solution in mineral spirits of the reaction product from by volume:
   Soya bean oil: 60%
   phthalic anhydride: 10%
   pentaerythritol: 10%
   2:4-toluene diisocyanate: 10%

3. A composition as claimed in claim 1 in which the drying oil is a urethane oil.

4. A composition as claimed in claim 1 in which the drying oil is boiled linseed oil.

5. A wood finishing composition consisting essentially of about three parts by volume of an alcoholic solution of white shellac;
   about two parts by volume of a solution of an oil modified polyurethane resin; and
   about one part by volume of a drying oil.

6. A process for finishing a sanded surface of a wood article which comprises;
 (a) applying thereto a composition comprising
  (i) about three parts by volume of an alcoholic solution of white shellac,
  (ii) from about one to about two parts by volume of an oil modified polyurethane resin,
  (iii) about one part by volume of a drying oil; and
 (b) buffing the surface for a time sufficient to provide a highly polished finish.

7. The process according to claim 6, in which the buffing is performed for about fifteen minutes.

8. The process according to claim 6, in which the oil modified polyurethane resin is a solution in mineral spirits of a reaction product of the following on a volume basis:
 soya bean oil: 60%
 phthalic anhydride: 10%
 pentaerythritol: 10%
 2:4-toluene diisocyanate: 10%
and the drying oil is selected from the group comprising urethane oil and boiled linseed oil.

* * * * *

UNITED STATES PATENT AND TRADEMARK OFFICE
CERTIFICATE OF CORRECTION

PATENT NO. : 4,240,939
DATED : December 23, 1980
INVENTOR(S) : Sam Kostic

It is certified that error appears in the above—identified patent and that said Letters Patent is hereby corrected as shown below:

In the specification: Column 2, line 37, after "stopped" insert --after--.

In the claims: Claim 1, column 2, line 48, "of" first occurrence should be --to--.

Signed and Sealed this

Twenty-first Day of April 1981

[SEAL]

Attest:

RENE D. TEGTMEYER

Attesting Officer     Acting Commissioner of Patents and Trademarks